United States Patent
Cho (10) Patent No.: US 6,922,728 B2
(45) Date of Patent: Jul. 26, 2005

(54) OPTIMAL INTERNET NETWORK CONNECTING AND ROAMING SYSTEM AND METHOD ADAPTED FOR USER MOVING OUTDOORS OR INDOORS

(75) Inventor: Dong-Ho Cho, Seoul (KR)

(73) Assignee: Korea Advanced Institute of Science & Technology, Taejon (KR)

(*) Notice: Subject to any disclaimer, the term of this patent is extended or adjusted under 35 U.S.C. 154(b) by 754 days.

(21) Appl. No.: 10/024,875

(22) Filed: Dec. 18, 2001

(65) Prior Publication Data

US 2002/0198977 A1 Dec. 26, 2002

(30) Foreign Application Priority Data

Jun. 20, 2001 (KR) ........................................ 2001-34976

(51) Int. Cl.[7] .............................................. G06F 15/16
(52) U.S. Cl. ........................ 709/227; 709/250; 709/238
(58) Field of Search ................................ 709/238, 250, 709/227

(56) References Cited

U.S. PATENT DOCUMENTS

| | | | | |
|---|---|---|---|---|
| 6,519,644 B1 | * | 2/2003 | Lindquist et al. | ............ 709/227 |
| 6,600,924 B1 | * | 7/2003 | Sinivaara et al. | ............ 455/444 |
| 6,731,621 B1 | * | 5/2004 | Mizutani et al. | ............ 370/338 |
| 6,760,601 B1 | * | 7/2004 | Suoknuuti et al. | ............ 455/557 |

FOREIGN PATENT DOCUMENTS

WO    PCT/SE98/00536      3/1998

* cited by examiner

*Primary Examiner*—Mehmet B. Geckil
(74) *Attorney, Agent, or Firm*—Graybeal Jackson Haley LLP (57) ABSTRACT

The present invention relates to an internet network connecting and roaming system and method providing internet communication service to a data communication carried by a user moving indoors or outdoors. In the present invention, the user is provided with a communication service by connecting with an outdoor wireless internet network such as an outdoor wireless LAN or packet network when the user is located outdoors. Then, upon receiving indoor system ID information, it is determined whether the received indoor system ID information is identical to stored indoor system ID information. If the two indoor system ID informations are identical to each other, the communication route of the data communication terminal is switched from the outdoor wireless internet network to the indoor gateway, and makes wireless communications with the indoor gateway through an indoor wireless connection module. Before the switching of the communication route, the location of the data communication terminal is authenticated by a location register and stored therein.

21 Claims, 7 Drawing Sheets

OPTIMAL INTERNET NETWORK CONNECTING AND ROAMING SYSTEM AND METHOD ADAPTED FOR USER MOVING OUTDOORS OR INDOORS

FIELD OF THE INVENTION

The present invention relates to a wireless mobile communication, and more particularly, to an optimal internet network connecting and roaming system and method for switching connection with an internet network in accordance with a user's location by allowing a wireless data communication terminal to be connected with a wired internet network through an indoor wireless connection module when the wireless data communication terminal is located indoors and by allowing it to be connected with a wireless internet network when it is located outdoors.

BACKGROUND OF THE INVENTION

Currently, the internet is being utilized as an essential communication media. Information provision and confirmation through the internet have been common and there is a growing tendency for wide use of the internet.

In order to use the internet, a terminal (such as a computer, a PCS phone, a cellular phone, a notebook PC, and a PDA) including a chip or a device capable of making connection with the internet is required. However, each terminal can be connected with the internet in different manners. For example, a computer or a notebook PC is connected with the internet through a wire, while a PCS phone, a cellular phone, or a PDA is connected with the internet based on a wireless communication protocol. If necessary, a computer or notebook PC can be connected with the internet through the wireless communications by connecting a PCS phone therewith.

As for methods of connecting with the internet through the wireless communications, there are a method of connecting with the internet by using an external mobile communication network including a base station, a base station controller, a mobile switching center and the like; a method of connecting with the internet through an outdoor wireless LAN (local area network) by using a wireless LAN card; a method of connecting with the internet through a wireless packet network, and the like.

Among them, the wireless LAN is a data communication network implemented as expansion or substitution of the wired LAN, and employs a method of transmitting and receiving data in the air by using a radio frequency or infrared rays instead of a wire (for example, 10/100 Base). Considering its coverage, capability, security, and the like, a spread spectrum type of wireless LAN that uses ISM (industrial scientific medical) bands (902–928 MHz, 2.4–2.48 GHz, 5.725–5.85 GHz) has been most widely used.

Further, the wireless packet internet network provides internet services in a packet mode by using frequently bands of 900 MHz and 1.8–2 GHz.

Generally, a user of the wired LAN connects with an LAN server through a cable by using a computer or notebook PC when he/she is located indoors and then also connects with an external internet network. In addition, a user of the outdoor wireless LAN network or wireless packet internet network connects with the internet indoors or outdoors through a network comprising an antenna, an access point, a router (or a hub or bridge), and the like by using a notebook PC with a wireless internet connection module or a PDA housed therein.

Meanwhile, the user of the wired LAN pays only fixed fees contracted with a relevant service provider, while the user of the wireless LAN must pay fees in proportion to the number of packets the user has sent and received through the connected internet Furthermore, since the fees for connection with the internet through the wireless LAN are relatively high, the wired LAN is more economical than the wireless LAN on a monthly payment basis.

Therefore, there is a problem in that users of the wireless LAN inevitably take on heavier monetary burdens than users of the wired LAN. Furthermore, there is also another problem in that when using the wireless LAN or a packet module, the quality of information becomes worse and a transmission speed thereof becomes slower than that of the wired LAN.

SUMMARY OF THE INVENTION

The present invention is contemplated to solve aforementioned problems. An object of the present invention is to provide an internet connection switching system and method which allows a user to connect with the internet through an indoor wired LAN when a mobile data communication terminal is located indoors and allows the user to connect with the internet through a wireless LAN network or an outdoor wireless internet network of a wireless packet network when it is located outdoors.

Another object of the present invention is to allow a user to receive an incoming call at a low cost regardless of whether the user is located indoors or outdoors.

A further object of the present invention is to provide a service through other external networks upon originating or receiving of a call in a case where the traffic of an indoor network is congested or a failure that cannot be fixed occurs.

According to the present invention for accomplishing the aforementioned objects, network paths (i.e. connection paths of a communication network) capable of connecting with the internet, a PSTN, or the like are switched depending on whether a user is located indoors or outdoors. That is, when the user is located indoors, a user's wireless internet terminal is connected with an indoor-wired LAN through wireless communication module. Alternatively, when the user is located outdoors, the user's wireless internet terminal is connected with an outdoor wireless internet network (a network which can be wirelessly connected with the internet) such as a wireless LAN network and a wireless packet network. Better communication quality with a lower cost is guaranteed to the user since the network connection can be switched in accordance with the location or movement of the user. At this time, a roaming service is provided through an optimal network path depending on whether the user is located indoors or outdoors.

In the present invention, an indoor wireless connection module is embedded into both a wireless internet terminal and an indoor gateway (including internet communication apparatus), that is, an apparatus connected with a wired LAN such that the user's wireless internet terminal can be connected with an indoor wired LAN. Thus, the wireless communications between the two communication apparatus can be made indoors.

Here, the indoor wireless connection module is an apparatus capable of supporting communication of data, voice, and the like between communication equipments located at short range. Further, the indoor wireless communication module is embedded into a wireless internet terminal such as a PDA, a notebook PC, a PCS phone and a cellular phone; indoor home appliances such as a desktop computer, a scanner, a facsimile, a TV and a printer; and other communication equipments and computer-aided equipments. Thus, the wireless communications can be made between the wireless internet terminal, and the home appliances, communication equipments and computer-aided equipments.

Therefore, a Bluetooth module, a wireless LAN connection module, a wireless packet communication connection module, and the like may be used as the indoor wireless connection module.

The present invention includes a location register for storing location information transmitted from the wireless internet terminal in order to confirm as to whether the user of the wireless internet terminal is located indoors or outdoors. The present invention can switch network paths to provide the roaming service in accordance with the location information stored in the location register.

In order to determine whether the wireless internet terminal is located indoors or outdoors, the wireless internet terminal determines whether ID information of an indoor system broadcasted from the indoor gateway is received, and in particular, whether the received ID information of the indoor system is equal to the stored ID information.

Accordingly, according to an aspect of the present invention for achieving the above objects, there is an optimal internet network connecting and roaming system providing internet communication service to a data communication terminal of a user moving indoors or outdoors, being characterized in that, the data communication terminal includes an indoor wireless connection module and stores registered indoor system ID information, so that the data communication terminal may be connected with the indoor network if the registered indoor system ID information is received and may be connected with the outdoor wireless internet network if the registered indoor system ID information is not received; the indoor gateway includes an indoor wireless connection module therein, broadcasts the indoor system ID information, makes wireless communications with the data communication terminal through the indoor wireless connection module, and is connected with the internet network via a wire; the location register stores location information of the data communication terminal received through the indoor network or outdoor wireless internet network; and the router determines the location of the data communication terminal stored in the location register and provides roaming of voice/data signals transfered to the user by selecting one of the indoor and the outdoor networks in accordance with the determined location of the data communication terminal.

When the data communication terminal is located outdoors, the location information is information on a locational area; and when it is located indoors, the location information is indoor system ID information.

Furthermore, according to another aspect of the present invention for achieving the above objects, there is an optimal internet network connecting and roaming method for providing internet communication service to a data communication terminal of a user moving indoors or outdoors using a communication system comprising an outdoor wireless internet network including an antenna, a router and a location register, and an indoor network including an indoor gateway connectable with an internet network, comprising a first step of providing the user with a communication service by connecting with the outdoor wireless internet network when the user is located outdoors; a second step of determining whether when indoor system ID information is received by the data communication terminal and the received indoor system ID information is identical to indoor system ID information stored in the location register; a third step of going through authentication of an indoor location of the data communication terminal by the location register and storing the indoor location into the location register if it is determined in the second step that the two of ID information are equal to each other; a fourth step of connecting with the internet network by switching connection of the data communication terminal from the outdoor wireless internet network to the indoor gateway and making wireless communications through the indoor gateway and an indoor wireless connection module; a fifth step of, when the data provided from the internet network in accordance with location information stored in the location register are transferred to the indoor gateway, supplying the data communication terminal with the data through the indoor gateway and the indoor wireless connection module; a sixth step of going through authentication of an outdoor location of the data communication terminal by the location register and storing the outdoor location into the location register when the indoor system ID information is not received; and a seventh step of switching the connection of the data communication terminal from the indoor gateway to the outdoor wireless internet network and performing the first step again.

Preferably, the indoor location stored in the location register includes the indoor system ID.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE INVENTION

Hereinafter, a method of switching connection between indoor and outdoor wireless internet networks when a user moves indoors or outdoors according to an embodiment of the present invention will be explained with reference to the accompanying drawings.

First, in the present invention, when a user is located indoors, an indoor wireless connection module and an indoor gateway (a gateway such as a home gateway or an IAD disposed in a home or building, or an internet communication apparatus) are used. Further, when the user is located outdoors, an ordinary outdoor wireless internet network is used. Therefore, when the user moves indoors, the present invention allows the connection with the communication network to be switched from the ordinary outdoor wireless internet network to an indoor communication network in which the communication is made through an indoor wireless connection module.

On the contrary, when a user moves outdoors, the present invention allows the connection with the communication network to be switched from the indoor network using the indoor wireless connection module to the ordinary outdoor wireless internet network.

Now, a Bluetooth module, a wireless LAN connection module and a wireless packet communication connection module which are the indoor wireless connection modules, and the home gateway will be described.

The Bluetooth is a short-range wireless communication technology that allows the multi-purpose connection to be made irrespective of types of conventional communication equipments, home and office appliances. The Bluetooth has been developed for the purpose of eliminating wire cables for data communications which are used for connection between a mobile phone, a PC, a digital still camera, a printer, a PDA, a gaming device and the like. At present, the standards thereof are being established by five leading companies including Ericsson Inc. in Sweden, IBM Corp. in U.S.A, Intel Corp. in U.S.A, Nokia Inc. in Finland, and TOSHIBA Corp. in Japan. Many companies including Ericsson Inc., CSR etc. produce Bluetooth chips.

A network that is constructed using the Bluetooth capable of supporting communication between various types of devices is called a WPAN (Wireless Personal Area Network). In a WPAN environment, an information device carried by a user is wirelessly connected with other adjacent information devices by using a Bluetooth protocol. In this way, a conventional standalone portable information terminal is combined with peripheral devices or devices connected with an external network so that highly advanced functions that are convenient to the user and that have been difficult to realize so far can be realized.

To this end, the Bluetooth uses a 2.4 GHz ISM (Industrial Scientific Medical) band that is a license-free band operable worldwide. In addition, the Bluetooth channel uses a FH/TDD (frequency-hop/time-division-duplex) mode, and this channel is divided into 625 msec time intervals as called slots. Different hop frequencies are used for the respective slots, and a hop rate is 1,600 hops/sec. Slots are alternately received and transmitted in the TDD mode.

In order for a user to actually use the Bluetooth through an application program, software that controls RF (radio frequency) and baseband signal processing hardware and connects the hardware to the application program is required. In a Bluetooth specification, a software protocol used for this object is described hierarchically, and it is well known in the art and thus will not be described in detail herein.

A wireless LAN connection module is an apparatus for allowing data communications between short-range communication equipments in a wireless LAN mode. A wireless communication packet module is an apparatus for allowing wireless communications between short-range communication equipments among wireless LAN terminals, or between a communication equipment and a wireless communication terminal.

A bi-directional pager module, a wireless data module, and a mobile packet data module such as GPRS, EDGE, 95C1X, 95C1XEVDO (HDR), 95C1XEVDO, and the like are referred to as a wireless packet communication module, and data information is received and transmitted between a terminal and a base station (access point) in a wireless packet mode.

Further, the home gateway (hereinafter, referred to as "HG") is a core apparatus for home information technology that connects a wireless/wire access network (subscriber network) with a home (indoor) network. In other words, it is an apparatus for interconnecting indoor network equipments, such as the Bluetooth and a home PNA (Phoneline Networking Alliance) which connects two or more terminals installed indoor with the wire/wireless communication network, with a subscriber network using an ADSL, a CATV network and the like.

The home gateway provides sharing of indoor resources; various additional services such as entertainment, education, medical examination, and home shopping using a network; remote automatic control using a portable information terminal; home security function, and the like, in addition to a super-high speed internet service and a real-time multimedia service.

Therefore, the indoor connection network of the present invention allows a communication equipment of a user moving indoors to be connected with the indoor gateway through the indoor wireless connection module, and allows the indoor gateway to be responsible for connection with the internet network.

Figure 1A:
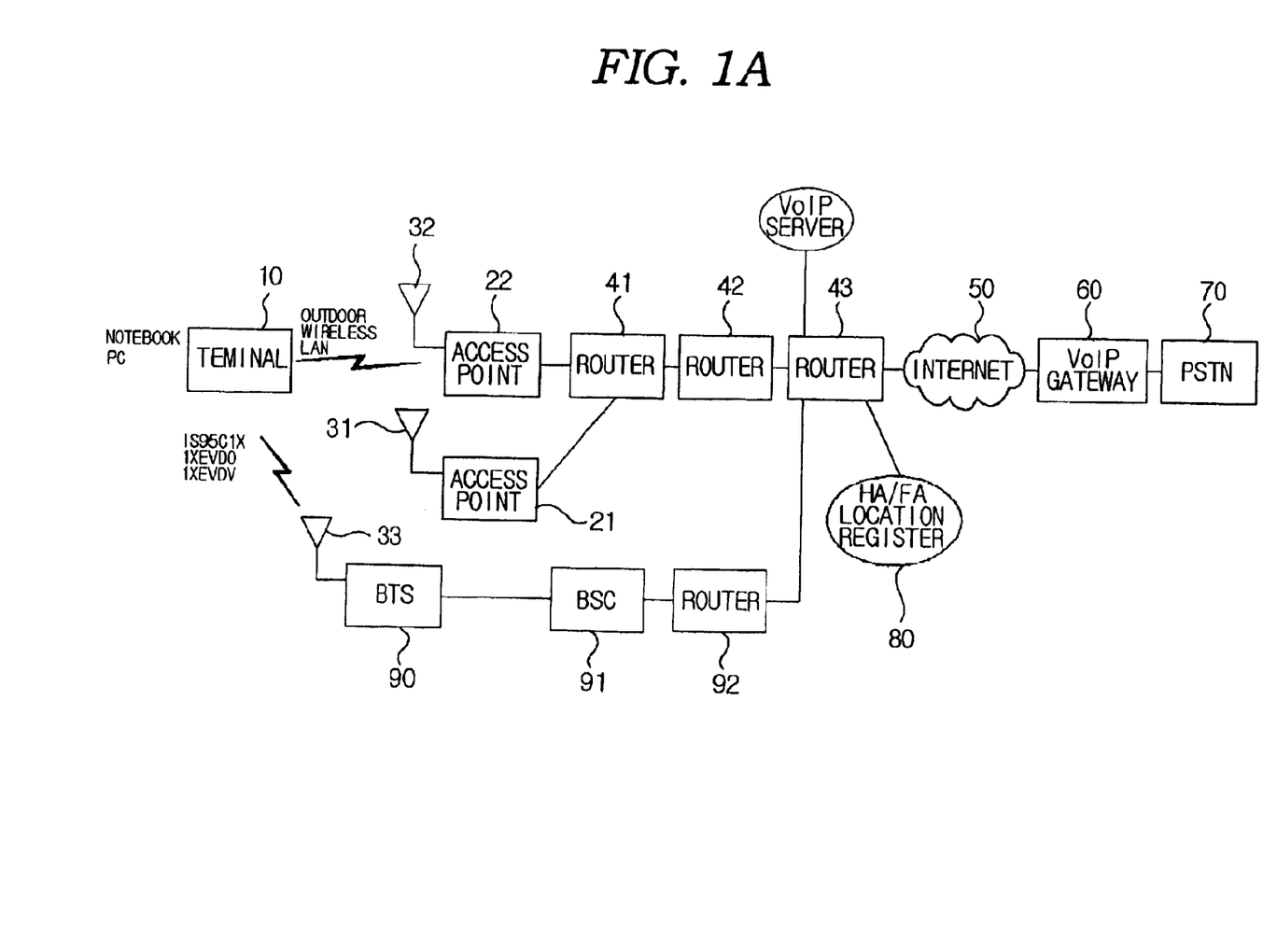
FIGS. 1A and 1B are diagrams illustrating examples of the configuration of an outdoor wireless internet network employed in the present invention.
Figure 1B:
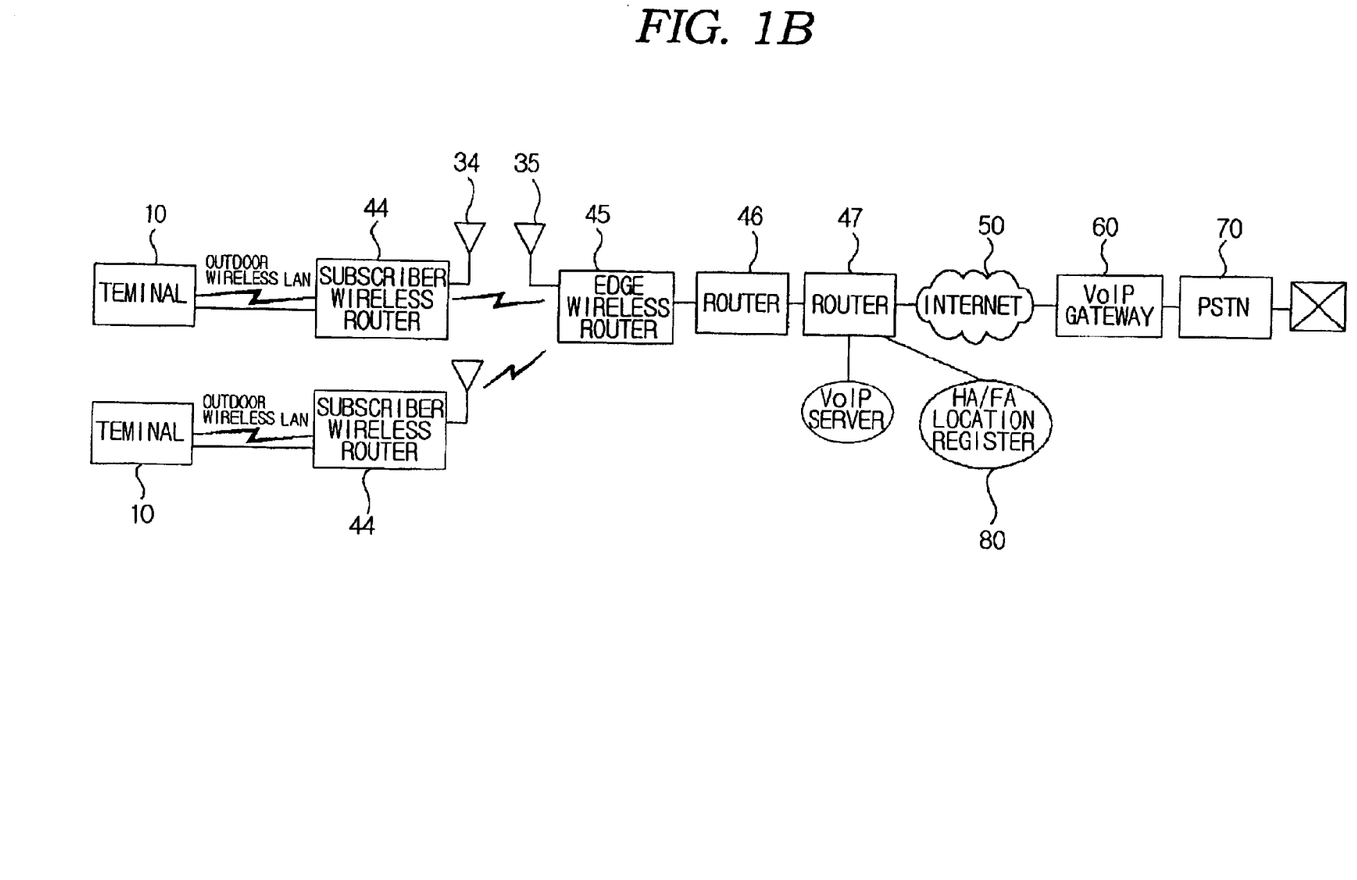

First, the configuration of an outdoor wireless internet network applied to the present invention will be described with reference to FIGS. 1a and 1b. FIGS. 1a and 1b are diagrams showing examples of the configuration of a general outdoor wireless internet network.

FIG. 1a shows the configurations of an outdoor wireless LAN network connected with the internet through an access point, and a wireless packet network. The outdoor wireless LAN network includes a data communication terminal 10; antennas 31, 32; access points 21, 22; a plurality of routers 41, 42, 43; and a location register 80. Meanwhile, in a wireless packet communication, mobile IP-based wireless internet services are provided by using a wireless packet communication module such as a 95C1X, 1XEVDO, and 1XEVDV. The wireless packet communication network comprises of an antenna 33, a BTS (Base Transceiver Station) 90, a BSC (Base Station Controller) 91, a router 92, and a location register 80.

FIG. 1b shows the configuration of an outdoor wireless LAN network connected with the internet through a wireless router. The outdoor wireless LAN network includes a data communication terminal 10; antennas 34, 35; a subscriber wireless router 44; an edge wireless router 45; a router 46; and a location register 80.

In FIGS. 1a and 1b, the respective routers are connected with one another and are connected with the internet. The internet 50 is connected with a PSTN 70 through a VoIP gateway 60.

The data communication terminal 10 is a PDA, a notebook PC or the like carried by a user, and contains a wireless LAN card therein so that data can be transmitted and received by using radio waves.

Antennas 31, 32 and 33 are installed to the access points 21, 22, and the BTS 90, respectively, so that data can be transmitted and received between a terminal and the access points 21, 22 or the BTS 90.

The access points 21, 22 are apparatus that are generally installed at a building and used for connection of a conventional wired LAN with a wireless LAN. In addition, the access points 21, 22 are connected with the wired LAN and provide functions of data transmission and buffering. One access point can support several tens to several hundreds of users and cover a range of several kilometers.

The routers perform function to transmit messages to the internet based on information provided thereto by a network protocol. More specifically, several hundreds to several thousands of computers communicate with one another in accordance with the predetermined addresses assigned to respective devices thereof. As the network becomes larger, it is impossible for every computer in the internet to memorize all the addresses of the other computers. Thus, there is a need for a scheme to allow every computer to communicate with each other only using a small amount of information without requiring all address information. Such a scheme can be constructed by dividing the internet network. Of course, in such a system, networks are interconnected with each other. Each of these divided networks is called a sub network, and a specific computer for interconnecting these sub networks is called a router. Thus, by using an aforementioned scheme, it is required that network computers recognize only their own networks in the internet without recognizing all address information of all the network computers.

A wireless router is an apparatus having a wireless packet function in addition to the function of the router.

Therefore, in the outdoor wireless LAN shown in FIG. 1a, an internet connection request signal (i.e. internet IP address) generated at the data communication terminal 10 is transmitted to an available wired LAN network through the access point 21 or 22. Then, the router 41 connected with the available wired LAN network transfers the connection request signal to another router 42, and the router 42 also transfers the connection request signal to the other router. After successively performing the transfer of the connection request signal between the routers, the connection request signal is finally transferred to the router 43 connected with the relevant internet server. Since an internet connection path is formed via a plurality of routers 41, 42, 43, the user can connect with the internet 50. At this time, the location information of the terminal 10 is stored in the location register 80.

Further, when the user uses the wireless packet communication module as shown in FIG. 1a, a registration message is transferred to the location register 80 through the BTS 90, the BSC 91, and the router 92 in order to first register the user's location in accordance with a mobile IP protocol. The location register 80 detects the location of recipient and transfers information to a relevant router.

Meanwhile, in the outdoor wireless LAN shown in FIG. 1b, a path for connection with an internet server corresponding to the internet connection request signal (i.e. internet IP address) generated from the data communication terminal 10 is routed by the edge wireless router. That is, a subscriber wireless router 44 or 44' adjacent to the terminal 10 transfers the internet connection request signal to the remote edge wireless router 45 through the antennas 34, 35. Then, the internet connection request signal is transferred to a router 47 connected with an internet server corresponding to the internet connection request signal by successively transferring the internet connection request signal from the router 46 to another router. Since the internet connection path is routed in this way by a plurality of wireless routers and routers, the user can connect with the internet 50.

Here, as shown in FIGS. 1a and 1b, in order to connect with the outdoor wireless LAN network or to utilize a roaming service through the outdoor wireless LAN network, a current location of a mobile host, i.e. the data communication terminal, should be stored in the location register. The location register may be a home agent or a foreign agent, and uses a mobile IPv4 or IPv6 address system in order to store the location into this location register.

The mobile IP supports mobility of the host by using mobile agents such as a foreign agent (FA) and a home agent (HA), periodic registration of the host's location by the home agent, and tunneling between the mobile agents or between the home agent and the mobile host. A unique IP address must be assigned to the mobile host (i.e. the data communication terminal) for using the mobile IP service.

As for a dynamic address assigning method, there is a method of using a DHCP (Dynamic Host Configuration Protocol). When an arbitrary host initially connects with a network, the DHCP client module downloads environment information on a relevant sub network from a relevant server and sets its own network environment.

Therefore, when the data communication terminal is initially connected with the outdoor wireless LAN network, the location of the terminal is registered by using the mobile IP registration message.

The access paths of the outdoor wireless LAN network, which have been described with reference to FIGS. 1a and 1b, belong to publicly known technology.

Hereinafter, an optimal internet network connecting and roaming system adapted for a user who moves indoors or outdoors according to the present invention will be described with reference to FIG. 2.

Figure 2:
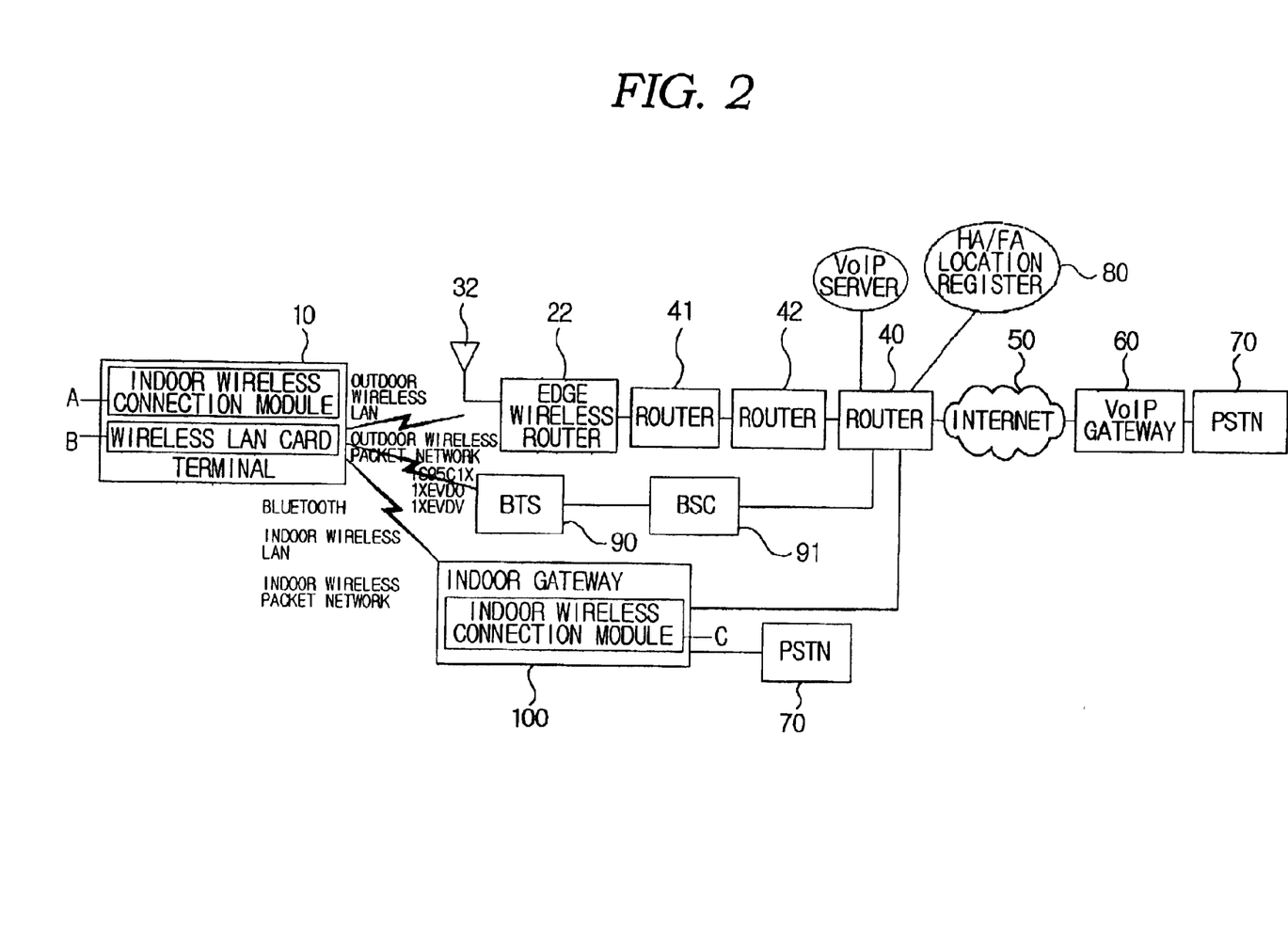
FIG. 2 is a diagram showing the configuration of an optimal wireless internet network connecting and roaming system adapted for a user who moves outdoors or indoors according to an embodiment of the present invention.

FIG. 2 is a block diagram showing the configuration of the optimal wireless internet network connecting and roaming system adapted for the user who moves indoors or outdoors according to the present invention. As shown in FIG. 2, the system of the present invention comprises of an outdoor wireless LAN network including the access point 22, the antenna 32 and the router 40 or the wireless packet network including the BTS 90, the BSC 91 and the router 40, as shown in FIG. 1; an indoor network including an indoor gateway 100; and an external network including the location register 80, the internet 50 including a plurality of internet servers, a VoIP gateway 60 and a PSTN.

The outdoor wireless LAN network and the wireless packet network are included in the outdoor wireless internet network.

As described above, the data communication terminal 10 is, for example, the PDA, the notebook PC, or the like. It includes an indoor wireless connection module A and a wireless LAN card B (or wireless packet connection module) therein, and stores information on at least one indoor system ID. Further, the indoor gateway 100 includes an indoor wireless connection module C therein, and its own unique system ID, i.e. indoor system ID information, is assigned thereto.

Accordingly, the data communication terminal 10 uses the wireless LAN card B or the wireless packet connection module (not shown) when it is connected with the outdoor wireless LAN network. Alternatively, the terminal 10 uses the indoor wireless connection module A when it makes wireless communicates with the indoor gateway 100.

Here, the indoor wireless connection module A or C corresponds to one of the Bluetooth module, the wireless LAN connection module and the wireless packet connection module.

The home gateway (HG), an IAD (Integrated Access Device), and the like may be used as the indoor gateway

100. The home gateway is generally installed in a house, and the IAD is installed in a building.

The indoor gateway 100 is connected with the data communication terminal 10 through the indoor wireless connection modules C and A so that the user can be connected with a home network, a SOHO network, the internet or a PSTN. In addition, the wireless internet terminal 10 located indoors can receive the indoor system ID information by allowing the indoor gateway 100 to broadcast the indoor system ID information through the indoor wireless connection module at a predetermined time interval.

The location register 80 is the home agent HA or the foreign agent FA which operates in accordance with the mobile IP protocol and records a current location of a data communication subscriber.

The location information stored in the location register 80 is information on a locational area when the data communication terminal is located outdoors. On the other hand, when the terminal is located indoors, it is indoor system ID information.

Hereinafter, a method of switching the connection with the wireless internet network when the user moves indoors while making a wireless internet call by using the system of the present invention shown in FIG. 2 will be described with reference to FIG. 3.

Figure 3:
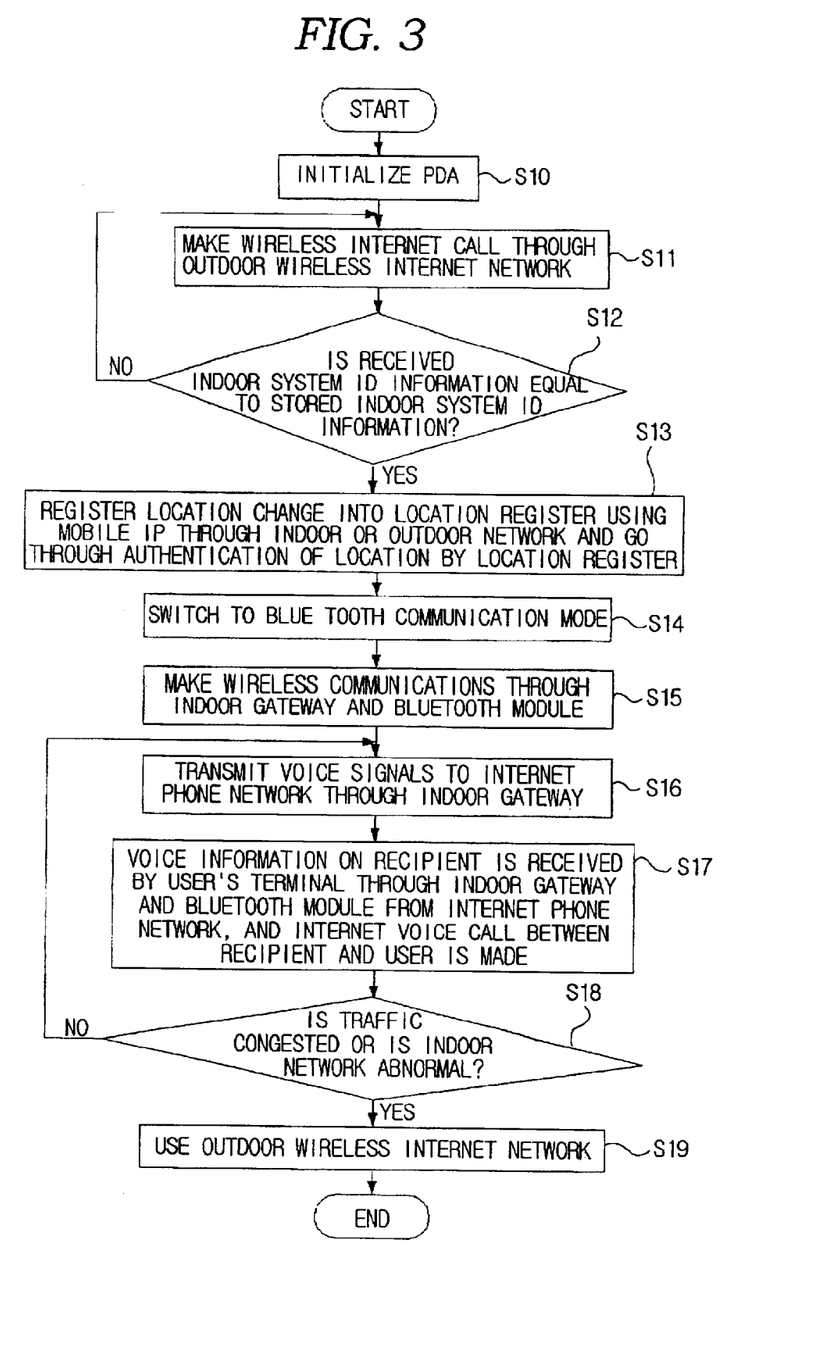
FIG. 3 is a flowchart illustrating how a connection-switching service is provided when a user moves indoors while making a wireless internet call according to the embodiment of the present invention.

FIG. 3 is a flowchart illustrating how a connection switching service is provided when the user moves indoors while making a wireless call according to an embodiment of the present invention, and shows a case where the Bluetooth module is used for the indoor wireless connection module. As for the data communication terminal applicable in FIG. 3, all kinds of wireless internet terminals capable of supporting the wireless data communications can be used. However, for easy understanding of the present invention, an embodiment in which a PDA is used as the data communication terminal will be described.

When the user turns on the PDA 10 outdoors, the PDA 10 is initialized and is supplied with electric power (step S10).

Then, the PDA 10 confirms as to whether the indoor system ID information is received. If it is determined that the registered system ID information of the indoor network is not received, the PDA 10 is set in an outdoor communication mode. Thus, the user can communicate with a remote recipient through the outdoor wireless LAN network, the internet, the VoIP gateway 60, and the PSTN 70.

That is, if the PDA 10 cannot receive the registered system ID information of the indoor network, the PDA 10 registers the location thereof into the location register 80 based on the mobile IP message through the path constructed by the antenna 32, the access point 22, and the routers 41, 42, 40 after going through authentication by the location register 80.

If the location of the PDA 10 is registered into the location register 80, the PDA 10 is connected with the internet and generates a communication number of a recipient (i.e. call originating messages including the number of the recipient) who the user wants to call. Then, call originating signals of the PDA 10 are sequentially transmitted through the outdoor wireless LAN network to the internet 50, the VoIP gateway 60, and the PSTN 70, and are finally transmitted to a telephone or wireless internet terminal of the recipient. Further, voice data transmitted from the recipient are transferred to the user's PDA 10 through the outdoor wireless LAN network in accordance with the location stored in the location register 80, and thus, a call between the user and the recipient can be made (step S11).

After step S11, if the user moves indoors while making the call or after finishing the call, the PDA 10 receives the indoor system ID information broadcasted from the indoor gateway 100 through the Bluetooth module A (step S12).

The PDA 10 compares the received indoor system ID information with the stored indoor network ID information. If it is determined that the two pieces of ID information are identical to each other, the PDA 10 determines that the user has moved indoors. The location of the PDA 10 is registered into the location register 80, after going through the authentication of the fact that the PDA has been moved by the location register through an outdoor or indoor wireless LAN network based on the mobile IP message.

If the requested authentication is successfully made, the location register 80 confirms that the user has moved indoors.

If the PDA 10 has gone through the authentication of location registration, the PDA 10 switches its own mode from the outdoor mobile communication mode to the indoor Bluetooth mode that is the indoor connection mode (step S14).

When the PDA 10 is switched to the Bluetooth mode in this way, the PDA 10 can make the wireless communications with the indoor gateway 100 through the Bluetooth modules A, C.

That is, if the PDA 10 is set to be in the Bluetooth mode, the PDA 10 is connected with the indoor gateway 100 in accordance with the indoor system ID information and makes wireless communications with the indoor gateway 100 through the Bluetooth modules A, C (step S15).

The indoor gateway 100 is connected with the internet 50 via a wire so that it connects the PDA 10 with the internet 50. Voice data signals generated from the PDA 10 as requested are transmitted to the VoIP gateway 60 through the internet 50, and the VoIP gateway 60 converts the received voice data signals into a protocol suitable to transfer the data to the PSTN 70. Then, the PSTN 70 transmits the signals received from the VoIP gateway 60 to the terminal of the relevant recipient (step S16).

Meanwhile, voice data or incoming messages transmitted from the terminal of the recipient are converted to a protocol for meeting internet connection standards through the VoIP gateway 60 and then transferred to the internet 50. The location register 80 controls a path of the incoming messages or voice data transmitted to the internet 50. That is, if it is determined that the user's location stored in the location register 80 has been changed from the outdoors to the indoors, the router connected with the location register transfers the voice data or incoming messages of the recipient to the indoor gateway 100 without passing them through the outdoor wireless LAN network.

Then, the indoor gateway 100 allows a voice call between the user and the recipient to be continuously made by transferring the voice data of the recipient to the user's PDA 10 through the Bluetooth (step S17).

Here, if it is determined that the indoor network is in an abnormal condition or the traffic of the indoor network is congested when the other person transmits an incoming message to the user (step S18), the HA location register allows the call to be made through the other outdoor mobile communication networks (step S19).

In such way, the call can be made without interruption although the user moves indoors. In particular, since the user utilizes the indoor network when he/she is located indoors, the user can continuously make the call with the recipient at a lower cost.

Furthermore, the present invention can provide the user with the convenience of a call by automatically switching the connection to the outdoor mobile communication network when the indoor network is in an abnormal condition or the indoor network cannot be used upon incoming of a call.

Next, a method of switching the connection with the wireless internet network according to an embodiment of the present invention when the user moves indoors during wireless internet data communications will be described with reference to FIG. 4.

Figure 4:
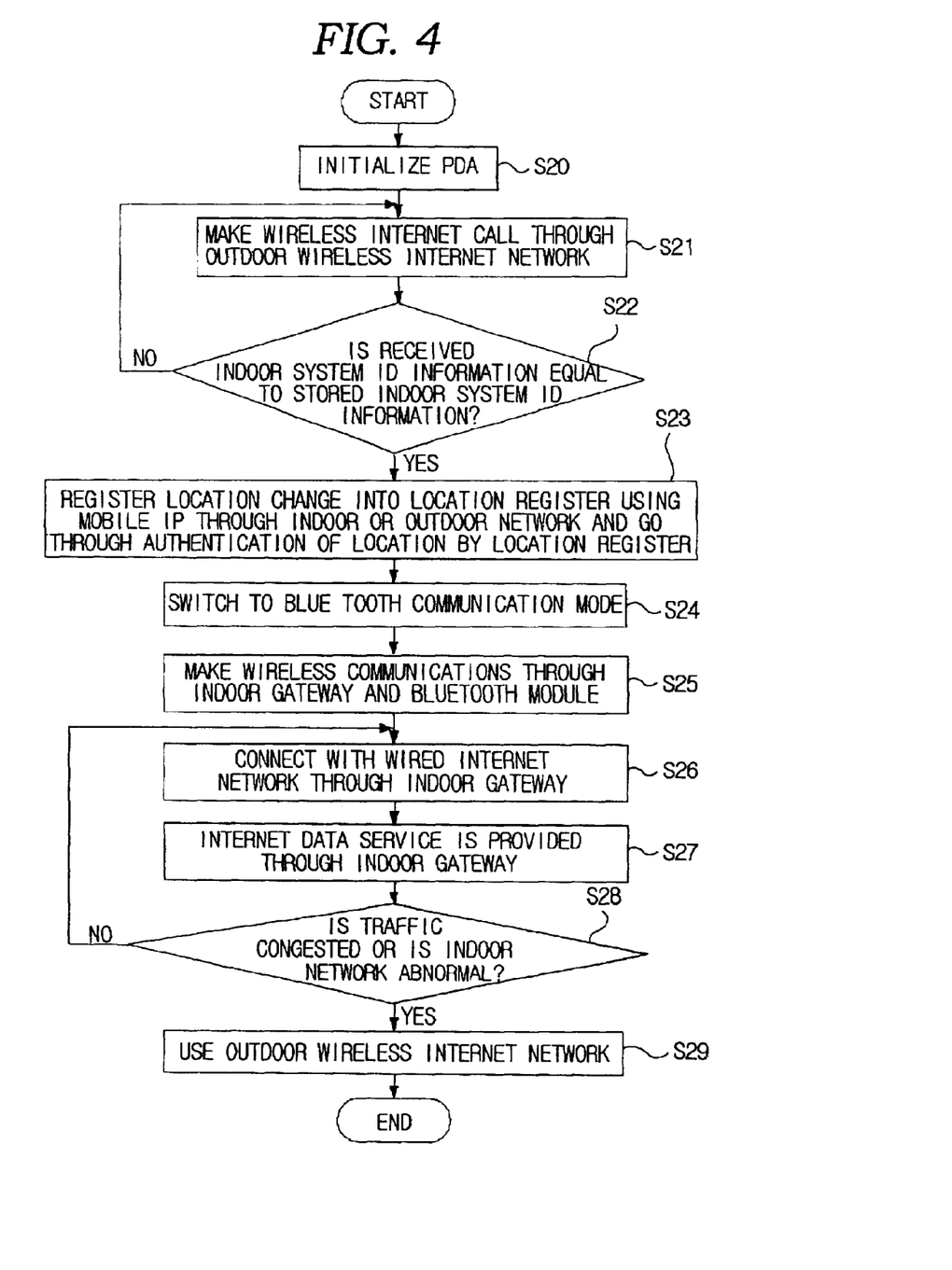
FIG. 4 is a flowchart illustrating how a connection-switching service is provided when a user moves indoors while making a wireless internet data communications according to the embodiment of the present invention.

FIG. 4 is a flowchart illustrating how an automatic connection switching service is provided when the user moves indoors during the wireless data communications according to an embodiment of the present invention.

As for the mobile data communication terminal, a notebook PC or a PDA can be utilized, and an example in which the PDA is used as the data communication terminal will be described below.

When the user turns on the PDA 10 outdoors, the PDA 10 is initialized and is supplied with electric power (step S20).

Then, the PDA 10 confirms through the Bluetooth module as to whether the indoor system ID information is received. If it is determined that the system ID information on the indoor network is not received, the PDA 10 is set in the outdoor data communication mode and is connected with the internet through the outdoor wireless LAN network (step S21).

At this time, the PDA 10 goes through authentication by the location register 80 and registers its location into the location register 80 through the outdoor wireless LAN network.

Then, if the user moves indoors while making internet data communications or after finishing the internet data communications, the PDA 10 receives the indoor system ID information broadcasted from the indoor gateway 100 (step S22).

The PDA 10 compares the received indoor system ID information with the stored indoor network ID information to determine whether the PDA 10 has authority capable of using the indoor system. In addition, if it is determined that the received ID information is identical to the stored ID information, the location of the PDA 10 is registered into the location register 80 after going through the authentication by the location register through the outdoor or indoor wireless LAN network in accordance with the mobile IP message.

The location register 80 confirms from the registration data that the location of the user has changed from the outdoors to the indoors.

If the PDA 10 has gone through the authentication of location registration, the PDA 10 switches its own mode from the outdoor data communication mode to the Bluetooth mode (step S24).

Then, the PDA 10 is connected with the indoor network in accordance with the indoor system ID information and makes wireless communications with the indoor gateway 100 through the Bluetooth modules A, C (step S25).

Accordingly, data information transmitted from the PDA 10 is transferred to the indoor gateway 100 through the Bluetooth module A, and then, the indoor gateway 100 transfers the information to the internet 50 (step S26).

Furthermore, incoming service information provided from the internet is transferred to the indoor gateway 100 in accordance with the user location information stored in the location register 80 without passing through the outdoor wireless LAN network. Then, the indoor gateway 100 transmits the internet incoming service information to the PDA 10 through the Bluetooth modules C, A, so that the user can continuously use the internet service with the PDA 10 (step S27).

Here, if it is determined that the indoor network is in an abnormal condition or the traffic of the indoor network is congested when the other person transmits an incoming message to the user (step S28), the HA/FA location register allows the call between the user and the sender to be made through the other outdoor mobile data communication networks (step S29).

In such way, the internet data communications can be made without interruption thereof although the user moves indoors. In particular, since the user utilizes the indoor network when he/she is located indoors, the user can continuously make the internet data communications at a lower cost.

Thus, when the user who is making the wireless internet data communications moves indoors, the communication connection according to the present invention is automatically switched from the wireless internet communications using the outdoor wireless LAN network to the wired internet communications using the indoor network.

In the present invention, since the data communication quality of the indoor network is superior to that of the outdoor network, when the user moves indoors, the communication connection may be always and automatically switched from the outdoor network to the indoor network. However, such method may give great inconvenience to the user, if the data communication quality of the indoor network is inferior to that of the outdoor network due to any unexpected reasons.

Therefore, according to the present invention, the switching of connection between communication networks is made only when the quality of the indoor network is better than that of the outdoor network after it is checked whether the quality of the indoor network is worse than that of the outdoor network. To this end, in the present invention, the data communication quality of the indoor network is estimated by using a loss rate of IP Datagram, an error rate of IP Datagram, an operating characteristics of a retransmission timer, average delay and variance, and the like so that the communication qualities between the indoor and outdoor networks are compared.

Hereinafter, a method of switching the connection with the wireless internet network according to the present invention when the user moves outdoors during the wireless internet communications will be described with reference to FIGS. 5 and 6.

Figure 5:
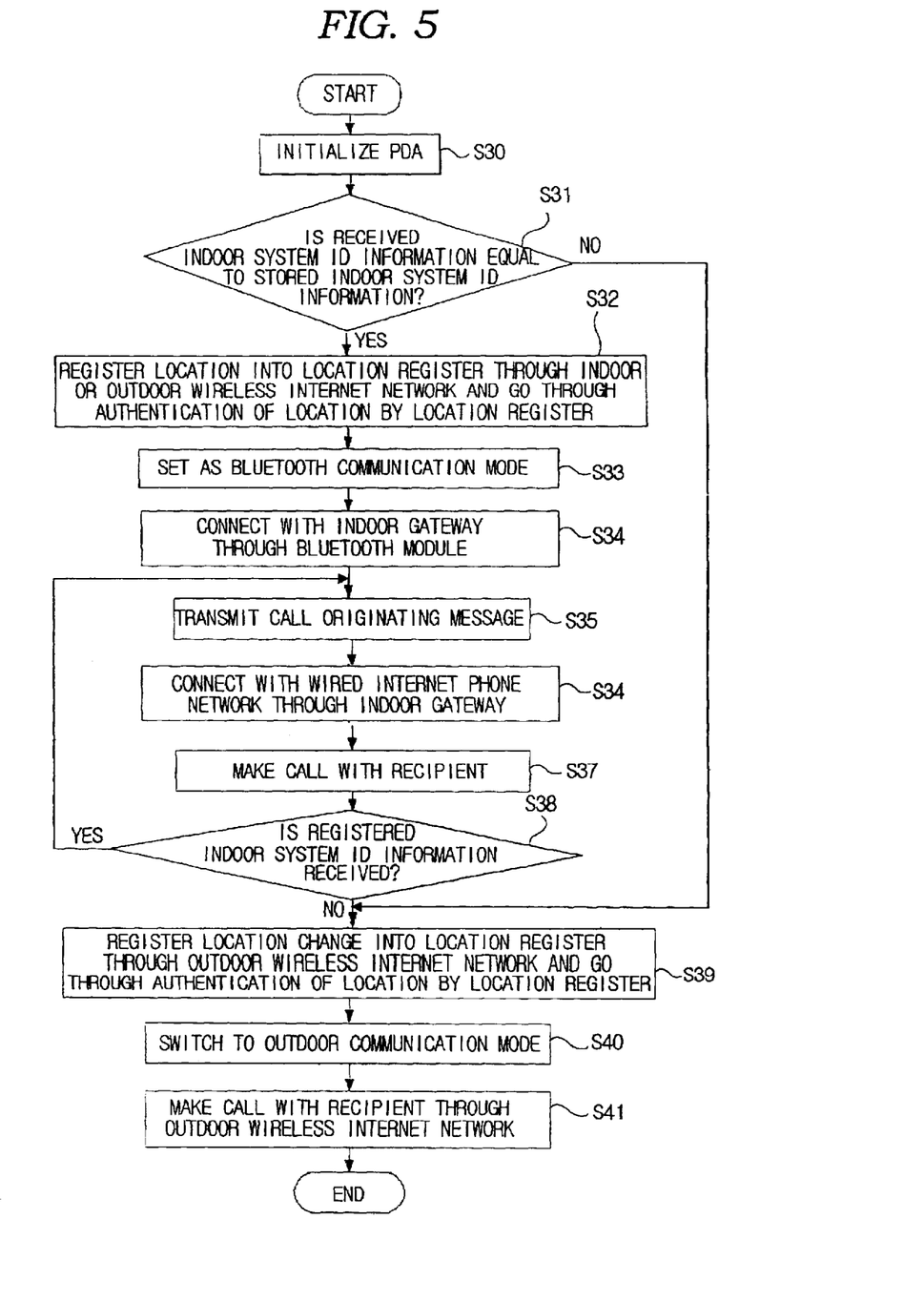
FIG. 5 is a flowchart illustrating how a connection-switching service is provided when a user moves outdoors while making the wireless internet call according to the embodiment of the present invention.

FIG. 5 is a flowchart illustrating how a connection switching service is provided when the user moves outdoors while making a wireless call according to an embodiment of the present invention, wherein the Bluetooth module is used for the indoor wireless connection module.

As shown in FIG. 5, when the user turns on the PDA 10 indoors, the PDA 10 is initialized and is supplied with electric power (step S30).

Then, the PDA 10 receives the system information on the indoor network broadcasted in a predetermined time interval from the indoor gateway 100 through the Bluetooth module, the wireless LAN connection module or the wireless packet communication connection module, and determines whether the received indoor system ID information is identical to the stored (registered) indoor system ID information (step S31).

If it is determined as the result of step S31 that the location of the PDA 10 is located indoors, the PDA 10 is registered into the location register 80 after going through authentication by the location register 80 through the outdoor or indoor wireless LAN network.

Here, when the received indoor system ID information is not equal to the indoor system ID information stored in the PDA, the PDA cannot use the indoor network and thus should use the outdoor wireless internet network.

Meanwhile, if the PDA 10 has gone through the location registration authentication through step S32, the PDA 10 receives the following incoming signals from the indoor gateway 100 through the Bluetooth modules A, C.

After the location of the PDA 10 is registered, the PDA 10 is set in the Bluetooth mode and is connected with the indoor network, i.e. the indoor gateway 100, by using the received indoor system ID information (step S33).

If the PDA 10 is connected with the indoor network, the PDA 10 is wirelessly connected with the indoor gateway 100 through the Bluetooth module, and thus, the wireless communications can be made (step S34).

Therefore, voice data signals or call originating messages generated from the PDA 10 are transferred to the indoor gateway 100 through the Bluetooth module A of the PDA 10, and the indoor gateway 100 receives the voice data signals or call originating messages through the Bluetooth module C and then transmits the signals to the internet (step S35).

Then, the internet 50 transmits the voice data signals or call originating messages received from the indoor gateway 100 to the PSTN 70 through the VoIP gateway 60, so that the user can make an internet call with the recipient (steps S36, S37).

Here, when the HA/FA location register 80 receives a signal requesting the transmission of a call incoming message or the voice data from the PSTN, the location register 80 transmits the call incoming message or voice data to the indoor gateway 100 in accordance with the user's location stored in the location register 80. Then, the indoor gateway 100 receives the voice data and wirelessly transmits the voice data to the PDA 10 through the Bluetooth module, so that a roaming service allowing a call between the sender and the recipient can be provided.

Then, if the user moves outdoors, the PDA 10 cannot receive the indoor system ID information broadcasted from the indoor gateway 100 (step S38).

When the PDA 10 cannot receive the indoor system ID information, it is determined that the PDA 10 is located outdoors. Accordingly, the PDA 10 transmits the mobile IP registration message to the outdoor mobile communication network and goes through the authentication of a current location by the location register 80 to register its current location (step S39).

When the PDA 10 registers its location into the location register 80, the PDA 10 switches its own mode to the outdoor communication mode (step S40).

Then, the PDA 10 transmits the voice signals to the recipient through the outdoor wireless LAN network and receives the voice signals transmitted from the recipient through the outdoor wireless LAN network, so that the user and the recipient can continuously communicate with each other (step S41).

Through the above processes, the user who has moved outdoors can continue a mobile communication without interruption. When the user again moves indoors, the indoor wireless communications can be made through the method of the present invention described with reference to FIG. 3.

Hereinafter, another embodiment of the present invention, regarding connection switching conducted when the user moves outdoors while making wireless data communications will be described with reference to FIG. 6. FIG. 6 is a flowchart illustrating how a connection switching service is provided when the user moves outdoors while making the wireless data communications according to the embodiment of the present invention, wherein the Bluetooth module is used for the indoor wireless connection module.

Figure 6:
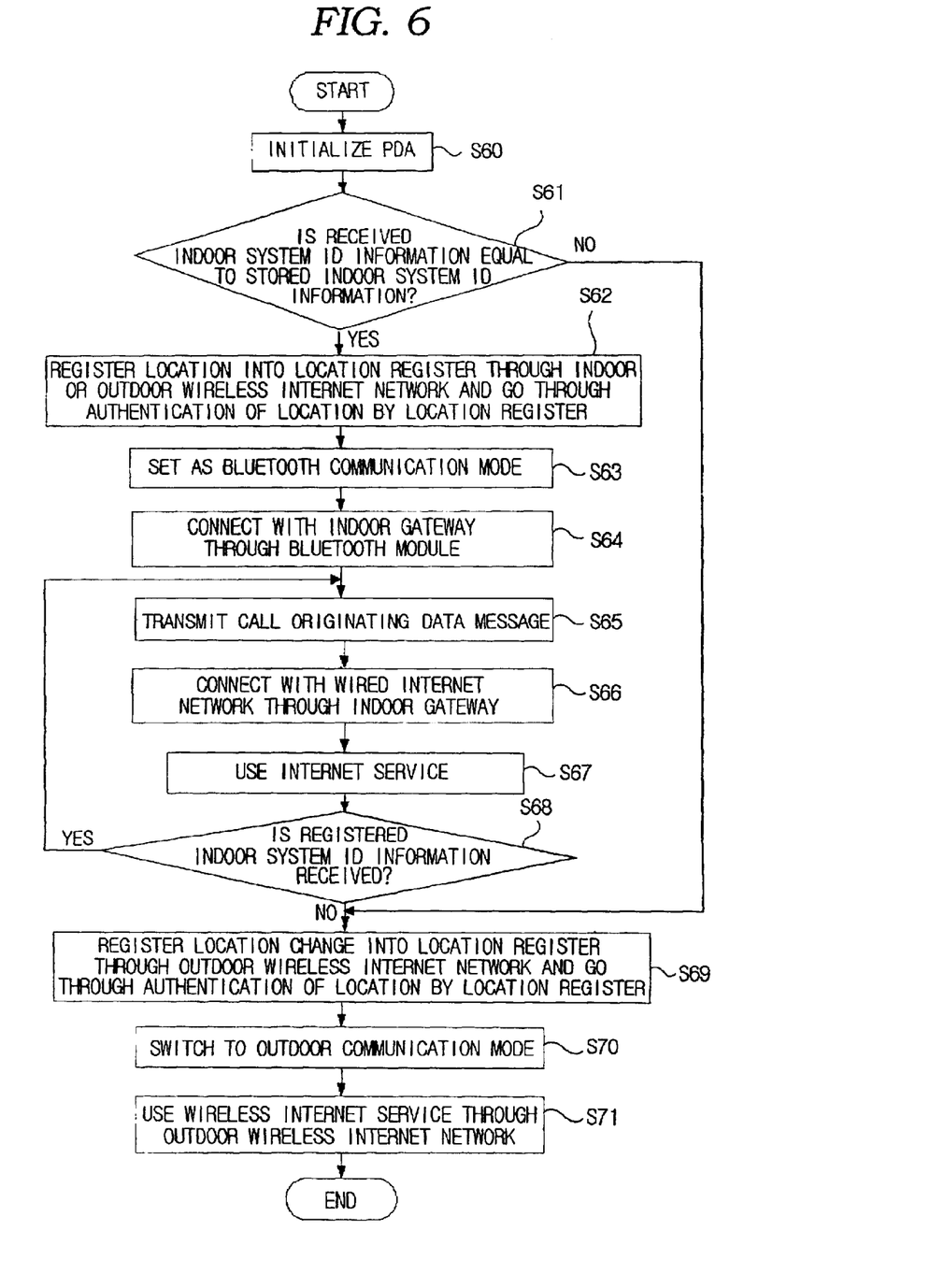
FIG. 6 is a flowchart illustrating how a connection-switching service is provided when a user moves outdoors while making the wireless internet data communications according to the embodiment of the present invention.

As shown in FIG. 6, the PDA 10 is initialized and is supplied with electric power (step S60). Then, the PDA 10 receives the indoor system ID information (step S61) and its location is accordingly registered into the location register 80 after going through authentication by the location register 80 through the outdoor wireless LAN network (step S62).

If the PDA 10 has gone through the authentication of the location registration, it is set to be in the Bluetooth mode (step S63), and is connected with the indoor gateway 100 through the Bluetooth module (step S64).

Then, if the user makes the wireless communications, the data transmitted from the PDA 10 are transferred to the internet 50 through the indoor gateway 100, and the services provided from the internet are received by the indoor gateway 100 and are then transferred to the PDA 10 through the Bluetooth module (steps S65, S66).

Therefore, the user can utilize the information provided from the internet thereto.

Thereafter, if the user moves outdoors, the PDA 10 cannot receive the indoor system ID information broadcasted from the indoor gateway 100. Accordingly, the PDA 10 should go through the authentication of the current location by the location register 80 to register its current location into the location register through the outdoor wireless internet network (step S67, S68, S69).

Further, the PDA 10 switches its own mode from the Bluetooth mode to the outdoor communication mode, is then connected with the internet through the outdoor wireless LAN, and finally receives the internet data services (steps S70, 71).

In the foregoing, the term "indoors" can mean the interior of all kinds of constructions such as buildings or houses. In particular, the term "indoors" can mean any regions within a range capable of receiving the system ID information of the indoor network identical to that registered into the data communication terminal. That is, the "outdoors" is regarded as a region incapable of receiving the system ID information of the indoor network through the data communication terminal, and the "indoors" is regarded as a region capable of receiving the system ID information on the indoor network through the data communication terminal.

Although the cases where the indoor wireless connection module is the Bluetooth module have been described with reference to FIGS. 3 to 6, a person skilled in the art can easily work the present invention even in the cases where the wireless LAN connection module or a wireless packet communication connection module is used as the indoor wireless connection module.

According to the present invention, there is an advantage in that the voice quality and the data processing speed of the internet communications can be improved and the useage cost can be reduced by switching the connection to an optimal communication network in accordance with the user's location when the user moves indoors or outdoors.

Further, there is another advantage in that the user can safely make a call by automatically providing the roaming service for changing a communication path from the indoor network to the outdoor wireless internet network when the indoor network is in an abnormal condition or the traffic is congested.

Although the present invention has been described above with reference to the accompanying drawings, it merely illustrates the preferred embodiments of the present invention only by way of examples. Thus, the present invention should not be limited thereto. Further, it will be readily understood by a person skilled in the art that various modifications and changes can be made thereto without departing from the scope and spirit of the present invention.

What is claimed is:

1. An internet network connecting and roaming system providing internet communication service to a data communication terminal of a user moving indoors or outdoors, using an outdoor wireless internet network including an antenna, a router and a location register, and an indoor network including an indoor gateway connectable with an internet network, the system comprising:
   a data communication terminal that includes an indoor wireless connection module and stores registered indoor system ID information, so that the data communication terminal may be connected with the indoor network if the registered indoor system ID information is received and by connecting with the outdoor wireless internet network if the registered indoor system ID information is not received;
   an indoor gateway that includes an indoor wireless connection module therein, broadcasts the indoor system ID information, makes wireless communications with the data communication terminal through the indoor wireless connection module, and is connected with the internet network via a wire;
   a location register that stores location information of the data communication terminal received through the indoor network or outdoor wireless internet network; and
   a router that determines the location of the data communication terminal stored in the location register and provides roaming of voice/data signals provided to the user by selecting one of the indoor and the outdoor networks in accordance with the determined location of the data communication terminal.

2. The internet network connecting and roaming system according to claim 1, wherein the data communication terminal compares the received indoor system ID information with the stored indoor system ID information, and sets its own mode to one of an indoor communication mode and an outdoor communication mode depending whether the received indoor system ID information is equal to the stored indoor system ID information.

3. The internet network connecting and roaming system according to claim 1, wherein one or more items of the indoor system ID information are registered in the data communication terminal.

4. The internet network connecting and roaming system according to claim 1, wherein the data communication terminal informs the location register that the terminal is located indoors by registering its location into the location register using a mobile IP if the registered indoor system ID information is received, and the data communication terminal informs the location register that the terminal is located outdoors by storing locational area information in the location register if the registered indoor system ID information is not received.

5. The internet network connecting and roaming system according to claim 4, wherein the data communication terminal switches its connection from the indoor network to the outdoor wireless internet network when it is registered into and authenticated by the location register that the location of the terminal registered into the location register has been changed from the indoors to the outdoors while making a call, or switches its connection from the outdoor wireless internet network to the indoor network when it is registered into and authenticated by the location register that the location of the terminal has been changed from the outdoors to the indoors.

6. The internet network connecting and roaming system according to claim 1, wherein the location register is one of a home agent and a foreign agent.

7. The internet network connecting and roaming system according to claim 1, wherein the indoor gateway is one of a home gateway and an IAD.

8. The internet network connecting and roaming system according to claim 1, wherein the indoor wireless connection module is a Bluetooth module.

9. The internet network connecting and roaming system according to claim 1, wherein the indoor wireless connection module is a wireless LAN connection module.

10. The internet network connecting and roaming system according to claim 9, wherein the indoor gateway is an internet communication equipment connected with either a wired or wireless LAN.

11. The internet network connecting and roaming system according to claim 1, wherein the indoor wireless connection module is a wireless packet communication connection module.

12. An internet network connecting and roaming method for providing internet communication service to a data communication terminal of a user moving indoors or outdoors using an outdoor wireless internet network including an antenna, a router and a location register, and an indoor network including an indoor gateway connectable with an internet network, the method comprising:
   a first step of providing the user with a communication service by connecting with the outdoor wireless internet network when the user is located outdoors;
   a second step of determining whether when indoor system ID information is received by the data communication terminal and the received indoor system ID information is identical to indoor system ID information stored in the location register;
   a third step of going through authentication of an indoor location of the data communication terminal by the location register and storing the indoor location into the location register if it is determined in the second step that the two of ID information are equal to each other;
   a fourth step of connecting with the internet network by switching connection of the data communication terminal from the outdoor wireless internet network to the indoor gateway and making wireless communications through the indoor gateway and an indoor wireless connection module;
   a fifth step of, when the data provided from the internet network in accordance with location information stored in the location register are transferred to the indoor gateway, supplying the data communication terminal with the data through the indoor gateway and the indoor wireless connection module;
   a sixth step of going through authentication of an outdoor location of the data communication terminal by the location register and storing the outdoor location into the location register when the indoor system ID information is not received; and
   a seventh step of switching the connection of the data communication terminal from the indoor gateway to the outdoor wireless internet network and performing the first step again.

13. The internet network connecting and roaming method according to claim 12, wherein the indoor location information stored in the location register including the indoor system ID information is updated.

14. The internet network connecting and roaming method according to claim 12, wherein the second step includes the step of comparing a plurality of indoor system ID informations stored in the location register with the received indoor system ID information and determining whether the received indoor system ID information is identical to any one of the stored indoor system ID informations.

15. The internet network connecting and roaming method according to claim 14, wherein the indoor wireless connection module is housed in the data communication terminal and the indoor gateway, respectively.

16. The internet network connecting and roaming method according to claim 12, wherein the indoor wireless connection module is a Bluetooth module.

17. The internet network connecting and roaming method according to claim 12, wherein the indoor wireless connection module is a wireless LAN connection module.

18. The internet network connecting and roaming method according to claim 17, wherein the indoor gateway is an internet communication equipment connected with either a wired or wireless LAN.

19. The internet network connecting and roaming method according to claim 12, wherein the indoor wireless connection module is a wireless packet communication connection module.

20. The internet network connecting and roaming method according to claim 12, wherein the second step is performed in the course of the internet communication service.

21. The internet network connecting and roaming method according to claim 12, wherein the second step is performed after completion of the internet communication service.

* * * * *